US009541257B2

(12) United States Patent
Castillo

(10) Patent No.: US 9,541,257 B2
(45) Date of Patent: Jan. 10, 2017

(54) LENS FOR PRIMARILY-ELONGATE LIGHT DISTRIBUTION

(75) Inventor: Mario Alberto Castillo, Racine, WI (US)

(73) Assignee: Cree, Inc., Durham, NC (US)

(*) Notice: Subject to any disclaimer, the term of this patent is extended or adjusted under 35 U.S.C. 154(b) by 316 days.

(21) Appl. No.: 13/408,882

(22) Filed: Feb. 29, 2012

(65) Prior Publication Data

US 2013/0223060 A1   Aug. 29, 2013

(51) Int. Cl.
| | |
|---|---|
| F21V 13/04 | (2006.01) |
| G02B 19/00 | (2006.01) |
| F21V 8/00 | (2006.01) |
| F21V 5/04 | (2006.01) |
| F21V 7/00 | (2006.01) |
| F21Y 101/00 | (2016.01) |

(52) U.S. Cl.
CPC .......... *F21V 13/04* (2013.01); *F21V 5/04* (2013.01); *F21V 7/0091* (2013.01); *G02B 19/0028* (2013.01); *G02B 19/0061* (2013.01); *F21Y 2101/00* (2013.01)

(58) Field of Classification Search
CPC ........ F21V 5/046; F21V 5/048; F21V 7/0091; F21V 13/04; F21V 5/04; F21V 2101/02; G02B 19/0061; G02B 19/0028
USPC .......... 362/326, 311.02, 311.06, 311.12, 340
See application file for complete search history.

(56) References Cited

U.S. PATENT DOCUMENTS

| | | |
|---|---|---|
| 1,404,004 A | 1/1922 | Benford |
| 1,535,486 A | 4/1925 | Lundy |
| 2,007,033 A | 7/1935 | Williams |
| 2,212,876 A | 8/1940 | Chauvet |
| 2,254,961 A * | 9/1941 | Harris .......................... 362/327 |
| 2,356,654 A * | 8/1944 | Cullman ....................... 362/223 |
| 2,802,097 A | 9/1952 | Franck |
| 2,908,197 A | 10/1959 | Wells et al. |

(Continued)

FOREIGN PATENT DOCUMENTS

| | | |
|---|---|---|
| EP | 1107210 A2 | 6/2001 |
| GB | 2282700 | 4/1995 |

(Continued)

OTHER PUBLICATIONS

Future Lighting Solutions "the 6 Steps to LED Lighting Success" brochure. Date: undated. 6 pages.

*Primary Examiner* — Sharon Payne
(74) *Attorney, Agent, or Firm* — Jansson Munger McKinley & Kirby Ltd.

(57) ABSTRACT

A lens for a primarily-elongate distribution of light from a light emitter having an axis with a lens base being substantially normal to the axis. The lens includes a substantially-rectangular emitter opening to a cavity defined by a refracting inner surface. The lens further includes a refracting main output surface transverse the axis and a reflecting surface extending from the lens base away from the axis outwardly of and around the inner surface. The reflecting surface receives substantially all forward and rearward light and a portion of lateral light refracted by the inner surface for total internal reflection (TIR) toward the main output surface which refracts such light into the elongate distribution. The lens is configured such that the other portion of the lateral light exits the lens away from the axis for wide-angle distribution along the elongate distribution.

36 Claims, 7 Drawing Sheets

(56) References Cited

U.S. PATENT DOCUMENTS

| | | |
|---|---|---|
| 3,497,687 A | 2/1970 | Hermann |
| 3,625,615 A | 12/1971 | Wilson |
| 4,186,995 A | 2/1980 | Schumacher |
| 4,254,453 A | 3/1981 | Mouyard et al. |
| 4,336,580 A | 6/1982 | Mouyard et al. |
| 4,345,308 A | 8/1982 | Mouyard et al. |
| 4,650,998 A | 3/1987 | Martin |
| 4,767,172 A | 8/1988 | Nichols et al. |
| 4,845,600 A | 7/1989 | Matsumura et al. |
| 4,862,330 A | 8/1989 | Machida et al. |
| 4,935,665 A | 6/1990 | Murata |
| 4,941,072 A | 7/1990 | Yasumoto et al. |
| 5,001,609 A | 3/1991 | Gardner et al. |
| 5,013,144 A | 5/1991 | Silverglate et al. |
| 5,014,165 A | 5/1991 | Naganawa |
| 5,062,027 A | 10/1991 | Machida et al. |
| 5,127,728 A | 7/1992 | Warren et al. |
| 5,140,220 A | 8/1992 | Hasegawa |
| 5,174,649 A | 12/1992 | Alston |
| RE34,254 E | 5/1993 | Dragoon |
| 5,289,082 A | 2/1994 | Komoto |
| 5,302,778 A | 4/1994 | Maurinus |
| 5,349,504 A | 9/1994 | Simms et al. |
| 5,592,578 A | 1/1997 | Ruh |
| 5,784,209 A | 7/1998 | Manabe |
| 5,813,743 A | 9/1998 | Naka |
| 5,813,752 A | 9/1998 | Singer et al. |
| 5,865,529 A | 2/1999 | Yan |
| 5,894,195 A | 4/1999 | McDermott |
| 5,894,196 A | 4/1999 | McDermott |
| 5,898,267 A | 4/1999 | McDermott |
| 5,924,788 A | 7/1999 | Parkyn, Jr. |
| 5,939,996 A | 8/1999 | Kniveton et al. |
| 5,995,291 A | 11/1999 | Togino |
| 6,097,549 A | 8/2000 | Jenkins et al. |
| 6,229,160 B1 | 5/2001 | Krames et al. |
| 6,244,727 B1 | 6/2001 | Ryan, Jr. et al. |
| 6,250,787 B1 | 6/2001 | Matubara |
| 6,273,596 B1 | 8/2001 | Parkyn, Jr. |
| 6,274,924 B1 | 8/2001 | Carey et al. |
| 6,283,613 B1 | 9/2001 | Schaffer |
| 6,296,376 B1 | 10/2001 | Kondo et al. |
| 6,323,063 B2 | 11/2001 | Krames et al. |
| 6,361,190 B1 | 3/2002 | McDermott |
| 6,361,192 B1 | 3/2002 | Fussell et al. |
| 6,443,594 B1 | 9/2002 | Marshall et al. |
| 6,473,238 B1 | 10/2002 | Daniell |
| 6,481,130 B1 | 11/2002 | Wu |
| 6,498,355 B1 | 12/2002 | Harrah et al. |
| 6,502,956 B1 | 1/2003 | Wu |
| 6,504,301 B1 | 1/2003 | Lowery |
| 6,536,923 B1 * | 3/2003 | Merz .......................... 362/327 |
| 6,541,800 B2 | 4/2003 | Barnett et al. |
| 6,547,423 B2 | 4/2003 | Marshall et al. |
| 6,550,940 B2 | 4/2003 | Kamiya et al. |
| 6,554,451 B1 | 4/2003 | Keuper |
| 6,560,038 B1 | 5/2003 | Parkyn, Jr. et al. |
| 6,570,190 B2 | 5/2003 | Krames et al. |
| 6,598,998 B2 | 7/2003 | West et al. |
| 6,601,962 B1 | 8/2003 | Ehara et al. |
| 6,607,286 B2 | 8/2003 | West et al. |
| 6,616,299 B2 | 9/2003 | Martineau |
| 6,637,921 B2 | 10/2003 | Coushaine |
| 6,679,621 B2 | 1/2004 | West et al. |
| 6,682,211 B2 | 1/2004 | English et al. |
| 6,721,101 B2 | 4/2004 | Daniell |
| 6,730,940 B1 | 5/2004 | Steranka et al. |
| 6,808,293 B2 | 10/2004 | Watanabe et al. |
| 6,837,605 B2 | 1/2005 | Reill |
| 6,846,101 B2 | 1/2005 | Coushaine |
| 6,851,835 B2 | 2/2005 | Smith et al. |
| 6,896,381 B2 | 5/2005 | Benitez et al. |
| 6,903,376 B2 | 6/2005 | Shen et al. |
| 6,918,677 B2 | 7/2005 | Shipman |
| 6,924,943 B2 | 8/2005 | Minano et al. |
| 6,929,384 B2 | 8/2005 | Watanabe et al. |
| 6,948,840 B2 | 9/2005 | Grenda et al. |
| 6,955,451 B2 | 10/2005 | Coushaine et al. |
| 6,987,613 B2 | 1/2006 | Pocius et al. |
| 6,991,355 B1 | 1/2006 | Coushaine et al. |
| 6,995,402 B2 | 2/2006 | Ludowise et al. |
| 7,009,213 B2 | 3/2006 | Camras et al. |
| 7,021,797 B2 | 4/2006 | Minano et al. |
| 7,042,021 B2 | 5/2006 | Isoda |
| 7,053,419 B1 | 5/2006 | Camras et al. |
| 7,063,441 B2 | 6/2006 | Kramer et al. |
| 7,063,450 B2 | 6/2006 | Ehara et al. |
| 7,064,355 B2 | 6/2006 | Camras et al. |
| 7,080,932 B2 | 7/2006 | Keuper |
| 7,083,313 B2 | 8/2006 | Smith |
| 7,104,672 B2 | 9/2006 | Zhang |
| 7,106,523 B2 | 9/2006 | McLean et al. |
| 7,111,972 B2 | 9/2006 | Coushaine et al. |
| 7,114,838 B2 | 10/2006 | Wu |
| 7,118,236 B2 | 10/2006 | Hahm et al. |
| 7,118,262 B2 | 10/2006 | Negley |
| 7,121,691 B2 | 10/2006 | Coushaine et al. |
| 7,125,143 B2 | 10/2006 | Hacker |
| 7,125,160 B2 | 10/2006 | Wong et al. |
| 7,150,553 B2 | 12/2006 | English et al. |
| 7,153,000 B2 | 12/2006 | Park et al. |
| 7,153,002 B2 | 12/2006 | Kim et al. |
| 7,172,324 B2 | 2/2007 | Wu et al. |
| 7,181,378 B2 | 2/2007 | Benitez et al. |
| 7,182,497 B2 | 2/2007 | Lee et al. |
| 7,213,945 B2 | 5/2007 | Yoneda et al. |
| 7,246,923 B2 | 7/2007 | Conner |
| 7,246,931 B2 | 7/2007 | Hsieh et al. |
| 7,254,309 B1 | 8/2007 | Chou et al. |
| 7,280,288 B2 | 10/2007 | Loh et al. |
| 7,329,029 B2 | 2/2008 | Chaves et al. |
| 7,348,723 B2 | 3/2008 | Yamaguchi et al. |
| 7,352,011 B2 | 4/2008 | Smits et al. |
| 7,410,275 B2 | 8/2008 | Sommers et al. |
| 7,411,742 B1 | 8/2008 | Kim et al. |
| 7,549,769 B2 | 6/2009 | Kim et al. |
| 7,563,004 B2 | 7/2009 | Pickard et al. |
| 7,674,018 B2 | 3/2010 | Holder et al. |
| 7,722,213 B2 | 5/2010 | Inoue et al. |
| 7,722,220 B2 | 5/2010 | Van De Ven |
| 7,722,227 B2 | 5/2010 | Zhang et al. |
| 7,736,019 B2 | 6/2010 | Shimada et al. |
| 7,766,509 B1 | 8/2010 | Laporte |
| 7,837,374 B2 | 11/2010 | Hsu et al. |
| 7,841,750 B2 | 11/2010 | Wilcox et al. |
| 7,854,536 B2 | 12/2010 | Holder et al. |
| 7,862,214 B2 | 1/2011 | Trott et al. |
| 7,866,837 B2 | 1/2011 | Ho |
| 7,901,098 B2 | 3/2011 | Saitoh et al. |
| 7,922,369 B2 | 4/2011 | Condon et al. |
| 7,938,559 B2 | 5/2011 | Angelini et al. |
| 7,942,558 B2 | 5/2011 | Zweig et al. |
| 8,002,435 B2 | 8/2011 | Laporte |
| 8,057,070 B2 | 11/2011 | Negley et al. |
| 8,058,665 B2 * | 11/2011 | Wang et al. ..................... 257/98 |
| 8,132,944 B2 | 3/2012 | Ruud et al. |
| 8,231,248 B2 * | 7/2012 | Fu et al. ................... 362/311.02 |
| 8,348,475 B2 | 1/2013 | Wilcox et al. |
| 8,382,338 B2 * | 2/2013 | Lee ........................... F21V 5/04<br>362/311.06 |
| 8,469,552 B2 * | 6/2013 | Moeller .................... F21V 5/04<br>362/311.02 |
| 8,573,815 B2 * | 11/2013 | Mallory et al. ........... 362/311.02 |
| 8,827,507 B2 | 9/2014 | Van De Ven et al. |
| 2004/0037076 A1 | 2/2004 | Katoh et al. |
| 2004/0114355 A1 | 6/2004 | Rizkin |
| 2004/0156209 A1 | 8/2004 | Ishida |
| 2004/0207999 A1 | 10/2004 | Suehiro et al. |
| 2004/0212291 A1 | 10/2004 | Keuper |
| 2005/0073849 A1 | 4/2005 | Rhoads et al. |
| 2005/0083699 A1 | 4/2005 | Rhoads et al. |
| 2005/0179041 A1 | 8/2005 | Harbers et al. |
| 2005/0205878 A1 | 9/2005 | Kan |
| 2005/0224826 A1 | 10/2005 | Keuper et al. |

(56) References Cited

U.S. PATENT DOCUMENTS

| | | |
|---|---|---|
| 2005/0281047 A1 | 12/2005 | Coushaine et al. |
| 2006/0013000 A1 | 1/2006 | Coushaine et al. |
| 2006/0013002 A1 | 1/2006 | Coushaine et al. |
| 2006/0039143 A1 | 2/2006 | Katoh et al. |
| 2006/0044806 A1 | 3/2006 | Abramov et al. |
| 2006/0067640 A1 | 3/2006 | Hsieh et al. |
| 2006/0082999 A1 | 4/2006 | Klein |
| 2006/0083000 A1 | 4/2006 | Yoon et al. |
| 2006/0105482 A1 | 5/2006 | Alferink et al. |
| 2006/0181902 A1 | 8/2006 | Tamura et al. |
| 2006/0186431 A1 | 8/2006 | Miki et al. |
| 2006/0198144 A1 | 9/2006 | Miyairi et al. |
| 2007/0019416 A1 | 1/2007 | Han et al. |
| 2007/0058369 A1 | 3/2007 | Parkyn et al. |
| 2007/0097693 A1 | 5/2007 | Klose |
| 2007/0133209 A1* | 6/2007 | Wang et al. .................. 362/294 |
| 2007/0201225 A1 | 8/2007 | Holder et al. |
| 2007/0258248 A1 | 11/2007 | Duhe |
| 2007/0274667 A1 | 11/2007 | Loh et al. |
| 2008/0101063 A1 | 5/2008 | Koike et al. |
| 2008/0205061 A1 | 8/2008 | Holder et al. |
| 2008/0239722 A1 | 10/2008 | Wilcox |
| 2009/0086498 A1 | 4/2009 | Condon et al. |
| 2009/0290360 A1 | 11/2009 | Wilcox et al. |
| 2009/0298376 A1 | 12/2009 | Guillien et al. |
| 2010/0014286 A1 | 1/2010 | Yoneda et al. |
| 2010/0027271 A1 | 2/2010 | Wilcox et al. |
| 2010/0027274 A1 | 2/2010 | Liu et al. |
| 2010/0039810 A1 | 2/2010 | Holder et al. |
| 2010/0073927 A1 | 3/2010 | Lewin et al. |
| 2010/0085763 A1 | 4/2010 | Aguglia |
| 2010/0085764 A1 | 4/2010 | Chuang |
| 2010/0110695 A1 | 5/2010 | Nakamura |
| 2010/0128488 A1 | 5/2010 | Marcoux |
| 2010/0135028 A1 | 6/2010 | Kokubo |
| 2010/0271708 A1 | 10/2010 | Wilcox |
| 2010/0271829 A1 | 10/2010 | Laporte |
| 2010/0295071 A1 | 11/2010 | Tsai et al. |
| 2010/0302786 A1 | 12/2010 | Wilcox et al. |
| 2010/0328941 A1* | 12/2010 | Zhang ...................... F21V 5/04 362/235 |
| 2011/0019425 A1* | 1/2011 | Chen et al. ............... 362/311.02 |
| 2011/0026247 A1 | 2/2011 | Zhang |
| 2011/0103070 A1 | 5/2011 | Zhang et al. |
| 2011/0110098 A1 | 5/2011 | Fu |
| 2011/0115360 A1 | 5/2011 | Holder et al. |
| 2011/0164425 A1 | 7/2011 | Chen |
| 2011/0186897 A1 | 8/2011 | Loh |
| 2012/0051047 A1 | 3/2012 | Lu et al. |

FOREIGN PATENT DOCUMENTS

| | | |
|---|---|---|
| JP | 60199746 | 10/1985 |
| JP | 61160328 | 7/1986 |
| JP | 61185980 | 8/1986 |
| JP | 61214485 | 9/1986 |
| JP | 8264839 | 10/1996 |
| WO | 8600146 A1 | 1/1986 |
| WO | WO9950596 | 10/1999 |
| WO | WO0024062 | 4/2000 |
| WO | 2006109113 A2 | 10/2006 |
| WO | WO2006109113 A2 | 10/2006 |
| WO | WO2006111805 A1 | 10/2006 |
| WO | WO2007018927 A2 | 2/2007 |
| WO | WO2008144672 A1 | 11/2008 |

* cited by examiner

LENS FOR PRIMARILY-ELONGATE LIGHT DISTRIBUTION

FIELD OF THE INVENTION

The invention relates generally to the field of lighting systems and, more particularly, to apparatus for utilizing LED light sources for illuminating areas with desired patterns of light intensity.

BACKGROUND OF THE INVENTION

In recent years, the use of light-emitting diodes (LEDs) for various common lighting purposes has increased, and this trend has accelerated as advances have been made in LEDs. Indeed, lighting applications which have been served by fixtures using high-intensity discharge (HID) lamps, halogen lamps, compact florescent light (CFL) and other light sources are now increasingly beginning to be served by LED modules. Such lighting applications include, among a good many others, interior lighting, such as for warehouse spaces.

Illumination of warehouse spaces have specific requirements which dictate the amount of light in certain areas. In particular, warehouse aisles have to be well illuminated with some illumination being directed along tall storage racks for efficient retrieval of stored items and, most importantly, for safe operation of the personnel.

Some efforts have been made to develop LED lenses for directing LED light into a desired light distribution. Some of such lenses are difficult and expensive to manufacture, which increases overall cost for LED lighting using such lenses. Yet such lenses fall short in providing light distribution required for proper illumination of elongate warehouse passageways with tall bordering shelving structures.

It would be highly beneficial to provide a lighting apparatus which produces a desired light distribution for illumination of areas like warehouse aisles and along storage racks accommodating appropriate visibility for stored bulky items with large labels and for small items with small labels. It is further desirable that such lighting apparatus has high efficiency with useful output of maximum emitted light and provides improved uniformity of the light distribution.

OBJECTS OF THE INVENTION

It is an object of this invention to provide a lens, preferably for LED-based devices, which directs maximum of emitted light into a desired distribution pattern useful for illumination of elongate passageways with tall bordering structures and which overcomes some of the problems and shortcomings of the prior art.

Another object of this invention is to provide a lens which distributes a majority of emitted light into an elongate distribution pattern for illumination of the elongate passageways.

Another object of this invention is to provide a lens which distributes a majority of emitted light into elongate distribution pattern for illumination of the elongate passageways.

Still another object of this invention is to provide a high-efficiency lens which directs a maximum amount of emitted light toward areas intended to be illuminated.

Yet another object of this invention is to provide a lens which directs light toward desired areas, doing so with improved uniformity.

Another object of this invention is to provide an LED lens which produces a desired illumination pattern that satisfies recommendations for industrial illuminance of areas like warehouse aisles.

These and other objects of the invention will be apparent from the following descriptions and the drawings.

SUMMARY OF THE INVENTION

This invention is an improved lens for directing a majority of light from a light emitter into an elongate distribution and also provides some lateral light along the sides of the elongate distribution. The emitter is preferably of the type having an axis such as light emitters which include at least one light-emitting diode (LED). The light emitter may include an LED package which has a primary lens over the at least one LED. In such embodiments, the inventive lens is a secondary lens placed over the primary lens.

The lens of this invention preferably includes an emitter-adjacent base which defines a main plane. The main plane is preferably substantially normal to the emitter axis. The base forms an opening to a cavity. The opening preferably receives the emitter with the cavity preferably surrounding the emitter. It is highly preferred that the opening be substantially-rectangular and the cavity have a front-to-back dimension which is greater than a side-to-side dimension.

An inner surface defines the cavity and includes a refracting inner surrounding surface and a refracting inner end surface. It is preferred that the inner surrounding surface extends from the opening substantially orthogonally with respect to the main plane to terminate at the refracting inner end surface. The inner end surface is preferably transverse the emitter axis.

The lens further includes a refracting main output surface which is transverse the emitter axis. The main output surface preferably includes front and back edges and a pair of lateral edges therebetween.

In highly preferred embodiments, a reflecting surface extends from the base away from the axis. It is preferred that the reflective surface be positioned outwardly of and around the inner surrounding surface. The reflective surface preferably receives substantially all forward and rearward light and a portion of lateral light refracted by the inner surrounding surface. The reflective surface is configured for a total internal reflection (TIR) of the received light toward the main output surface. The main output surface receives light from the refracting inner surface and from the reflecting surface and forms the elongate light distribution by refracting such received light.

It is further preferred that the lens include a pair of refracting lateral output surfaces. Each of the lateral output surfaces extends from one of the main-output-surface lateral edges toward the main plane. The lateral output surfaces refract the other portion of the lateral light refracted by the inner surrounding surface. The lateral output surfaces refract such portion of the lateral light away from the axis to provide wide-angle distribution along the elongate distribution.

When the inventive lens is installed in a lighting fixture for illuminating a warehouse aisle, the primary output surface directs light along the elongate aisle. In such applications, a portion of the lateral light refracted by the inner surrounding surface is received by the lateral output surfaces which direct such light along tops and sides of the tall aisle-bordering shelving structures.

It is preferred that the reflecting surface include front and back curves and a pair of lateral curves. Each of the lateral curves are preferably contiguous with the front and back curves. The front and back curves each have a first configuration. The pair of lateral curves each have a second configuration which is different from the first configuration. The reflecting surface is preferably convex.

The reflecting surface preferably terminates at distances from the plane which are greatest at a center of each of the front and back curves and gradually decrease toward a center of each of the lateral curves. It is further preferred that the reflecting surface terminates at distances from the emitter axis which are greatest at a center of each of the front and back curves and gradually decrease toward a center of each of the lateral curves. An angle between the main plane and each of the lateral curves of the reflecting surface is preferably greater than an angle between the main plane and each of the front and back curves. This configuration of the lateral curves permits the other portion of the lateral light which is refracted by the inner surface to pass directly to the lateral output surfaces.

The front and back curves are preferably each bilaterally symmetric. It is also preferred that the lateral curves are each bilaterally symmetric.

In preferred embodiments, the inner surrounding surface includes front and back portions and a pair of lateral portions. The pair of lateral portions each extend between the front and back portions and each preferably smoothly adjoins both the front and back portions. The front and back portions receive emitter light which is emitted forward and rearward. The front and back portions refract such emitter light away from the axis toward the front and back curves of the reflecting surface. The pair of lateral portions each receive lateral emitter light and refract such light away from the emitter axis.

It is preferred that the front and back portions of the inner surrounding surface be substantially planar. It is also preferred that the lateral portions of the inner surrounding surface be substantially planar.

The inner end surface is preferably substantially normal to the emitter axis. The inner end surface refracts emitter light toward the emitter axis for its further refraction by the main output surface. It is preferred that the inner end surface be substantially planar.

In preferred embodiments, the refracting main output surface is substantially planar. The main output surface is preferably substantially normal to the emitter axis. It is preferred that a front-to-back dimension of the main output surface be greater than a side-to-side dimension of the main output surface.

The front and back edges of the main output surface are preferably curved outwardly from the substantially-straight lateral edges. It is preferred that the front and back edges extend along sectors of a single circle with the circle center on the emitter axis. The lateral edges are preferably substantially parallel to each other. The lateral edges preferably extend substantially in a front-to-back direction.

Each of the lateral output surfaces are preferably substantially planar. In preferred embodiments, the lateral output surfaces are longitudinal indicators of the elongate light distribution such that the greater cross-dimension of the light distribution is along the longitudinal dimension of the lateral output surfaces.

Preferred embodiments of this invention further include an outer surrounding wall. An outer side of the outer surrounding wall extends from the main output surface and from each of the lateral output surfaces toward the main plane. The outer side is preferably substantially cylindrical and is substantially orthogonal to the main plane. The outer side preferably has a right cylindrical shape of substantially circular cross-section taken in planes parallel to the main plane. An inner side of the outer surrounding wall extends from the reflecting surface toward the plane and is substantially orthogonal to the main plane. The inner side is preferably substantially cylindrical and has an elongate cross-section taken in planes parallel to the main plane. The inner side of the outer surrounding wall is elongate in the front-to-back direction such that an inner-side front-to-back dimension is greater than a side-to-side dimension.

Many other configurations for the outer surrounding wall are possible, including without limitation surfaces generated by movement of a line which is other than straight. In some alternative embodiments, the surrounding lateral surface may have various annular shapes, including shapes having different cross-sectional configurations at different positions therealong. The surrounding lateral surface may be angled with respect to the emitter axis.

In preferred embodiments, an outward flange extends from the outer surrounding wall away from the axis. The flange may include a perimeter configuration which facilitates mounting of the lens during light-fixture assembly and also indicates orientation of the light output. The flange may also have various markings, including a lens type identifier, light-output direction indicator, and a locator label which references the lens location in an LED-array module. These markings are preferably readable by robotic equipment for correct lens placement and orientation during light-fixture assembly. The flange may extend beyond the main plane with respect to the emitter axis in a direction opposite the light emission. This spacing may be dictated by the location of the emitter along the axis to allow the most efficient capturing of emitter light.

It is preferred that the inventive lens be bilaterally symmetric in a front-to-back direction. It is also preferred that the lens be bilaterally symmetric in a side-to-side direction.

In preferred embodiments of this invention, the refracting lens surfaces are configured along simple geometric forms such as a circle, right cylinder, rectangles and rectangular parallelograms. For example, the outer side of the outer surrounding wall has a shape of the right cylinder. The outer side extends from a circle along an outer-wall junction with the outward flange and orthogonally to the output surfaces. The main output surface is planar and normal to the axis of the right cylinder such that the front and back edges extend along the same circle as the outer-wall junction with the outward flange. The inner cavity has a shape of a rectangular parallelogram formed by five mutually perpendicular inner-surface portions with slightly rounded corners along the axis. And, the outward flange has an outer perimeter of an equilateral octagon shape.

In other words, free forms and free curves are utilized minimally in the inventive lens. The reflective surface can be said to include free-form curves which are configured for total internal reflection of maximum of light which reaches the reflective surface. However, even the reflective surface has specific reference points which are preferably located on front-to-back and side-to-side planes of symmetry. More specifically, the reflective surface has four reference points on each of these planes of symmetry. The front-to-back plane includes front and back-curve reference points on the main plane and front and back-curve end points distal from the main plane. The front and back curve reference points are positions at which the reflective surface is the farthest from the main plane. And, the side-to-side plane includes two lateral-curve reference points on the main plane and lateral-curve end points distal from the main plane. The lateral-curve reference points are positions at which the reflective surface terminates the closest from the main plane. The corresponding main-plane and end reference points are connected along a slightly convex curve which is generated by using a technique known as "lofting" which may utilize a computer software for generating the reflecting-surface curve for most efficient TIR. One of the software programs that may be used for generating the reflecting-surface curves is known as "Photopia." This program is the most widely used optical design and analysis software which allows efficient virtual non-imaging optical designs.

The preferred embodiments of the inventive lens have the configuration which is described above and which also preferably allows for molding the lens in a single-piece mold. In other words, the lens configuration preferably permits easy removal of the lens from the mold without the need for separating the mold pieces as is the case with some lenses that require multiple-piece molds. The inventive lens is simply pulled out of the mold.

The term "transverse," as used herein in reference to the inner end surface and the main output surface with respect to the emitter axis, means that these surfaces intersect the emitter axis. In the most preferred embodiments, the inner end surface and the main output surface are each substantially normal to the emitter axis.

DETAILED DESCRIPTION OF PREFERRED EMBODIMENTS

Figure 6:
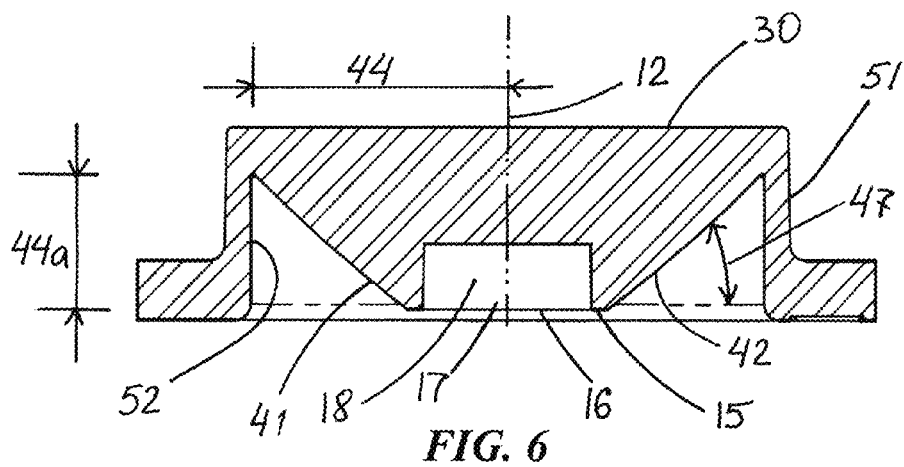
FIG. 6 is a front-to-back sectional view of the of the lens of FIG. 1, taken along section 6-6 shown in FIG. 4.
Figure 7:
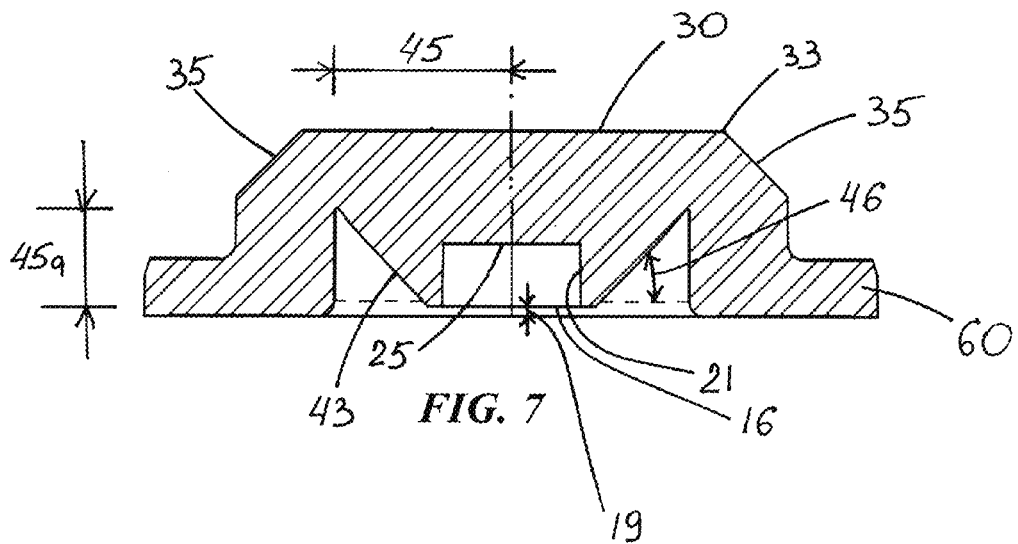
FIG. 7 is a side-to-side sectional view of the of the lens of FIG. 1, taken along section 7-7 shown in FIG. 4.
Figure 8:
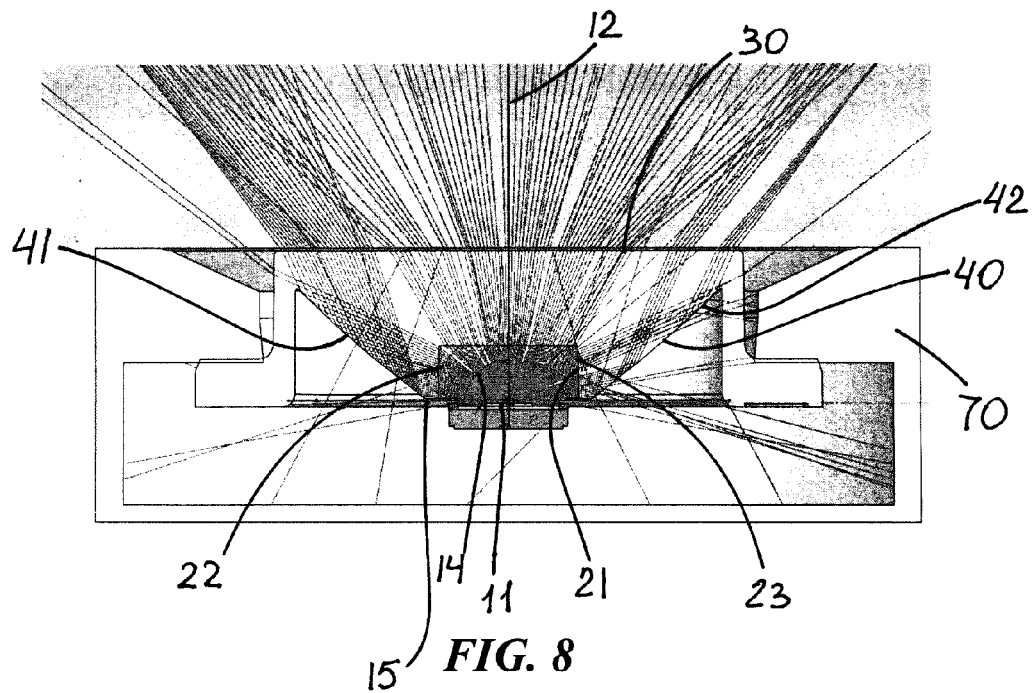
FIG. 8 is another front-to-back sectional view representing the forward and rearward light distribution of the lens forming the elongate light distribution.
Figure 9:
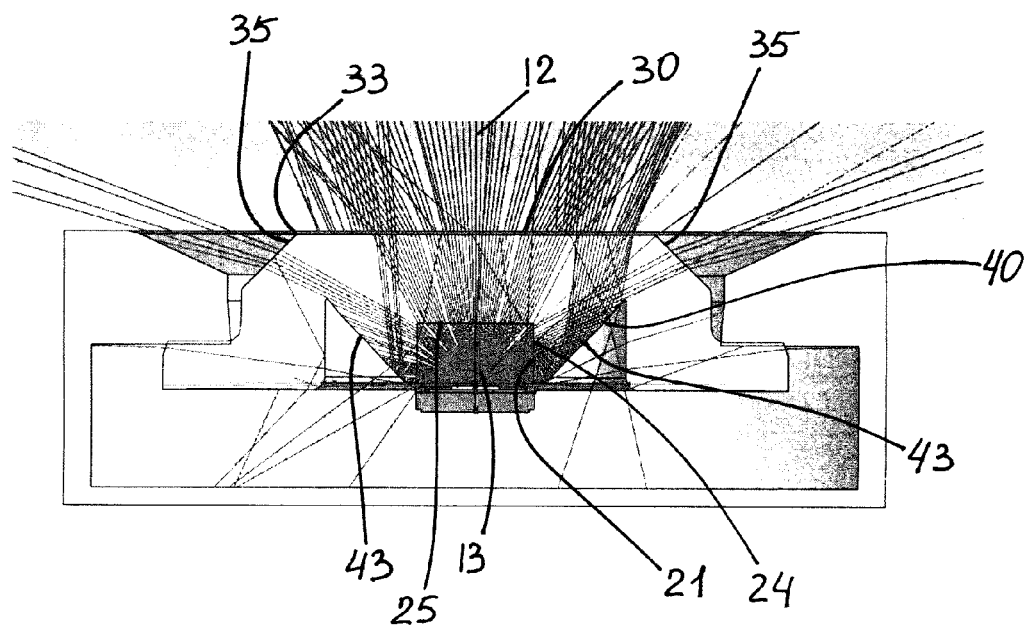
FIG. 9 is another side-to-side sectional view illustrating lateral aspects of the light distribution.
Figure 10:
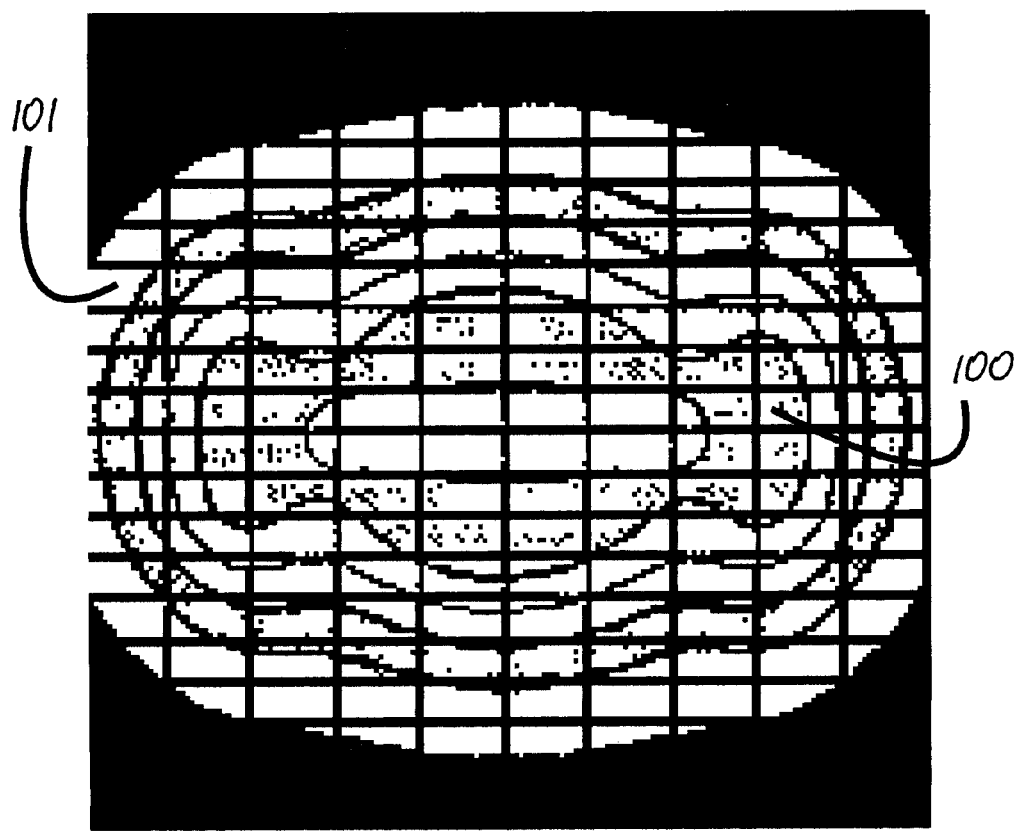
FIG. 10 is a two-dimensional ISO plot of illumination intensity distribution by the inventive lens on an illuminated surface substantially normal to the emitter axis.
Figure 11:
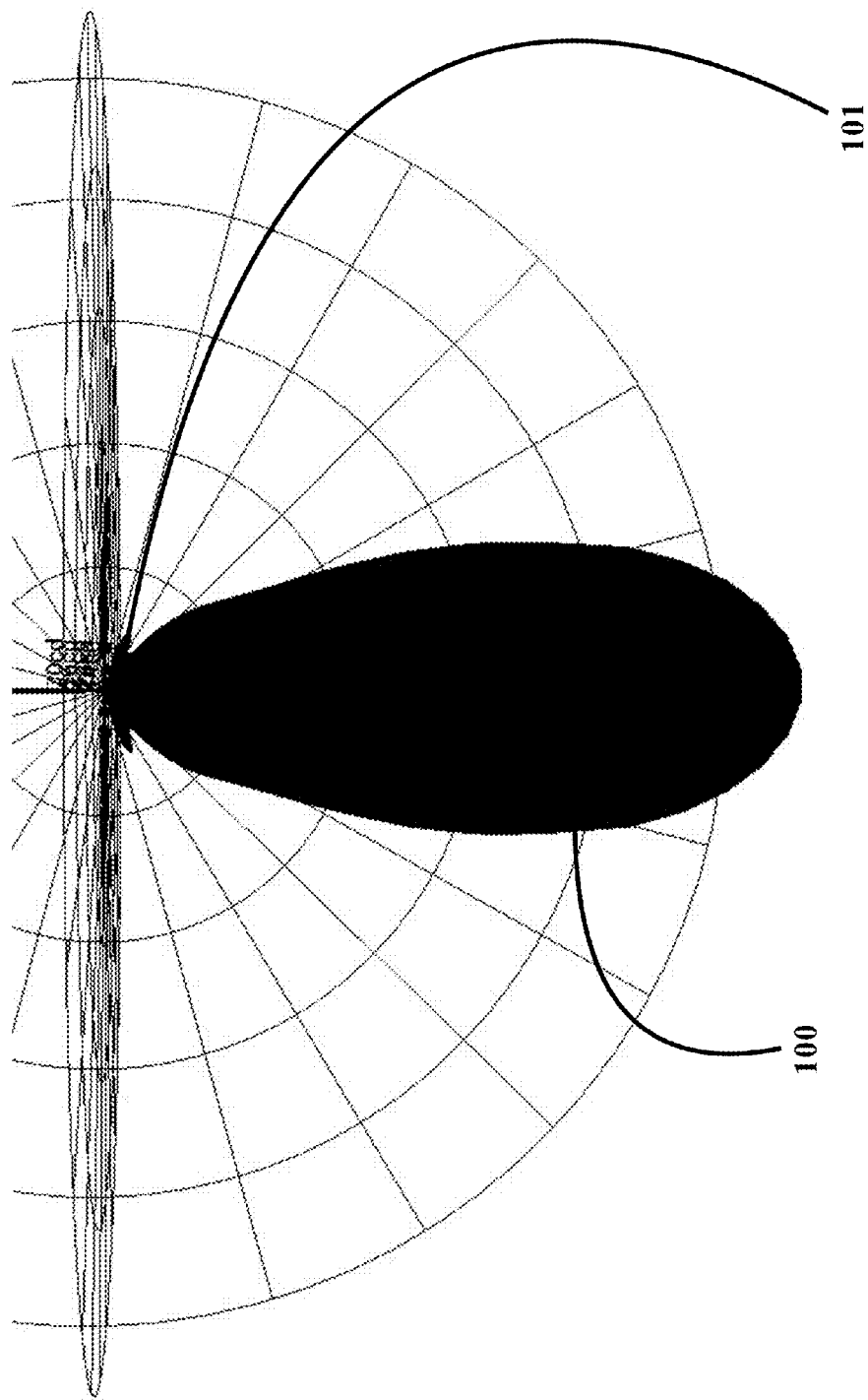
FIG. 11 is a polar intensity distribution in a plane which includes the emitter axis, illustrating light directed toward the elongate light distribution and therealong for lateral illumination.
Figure 12:
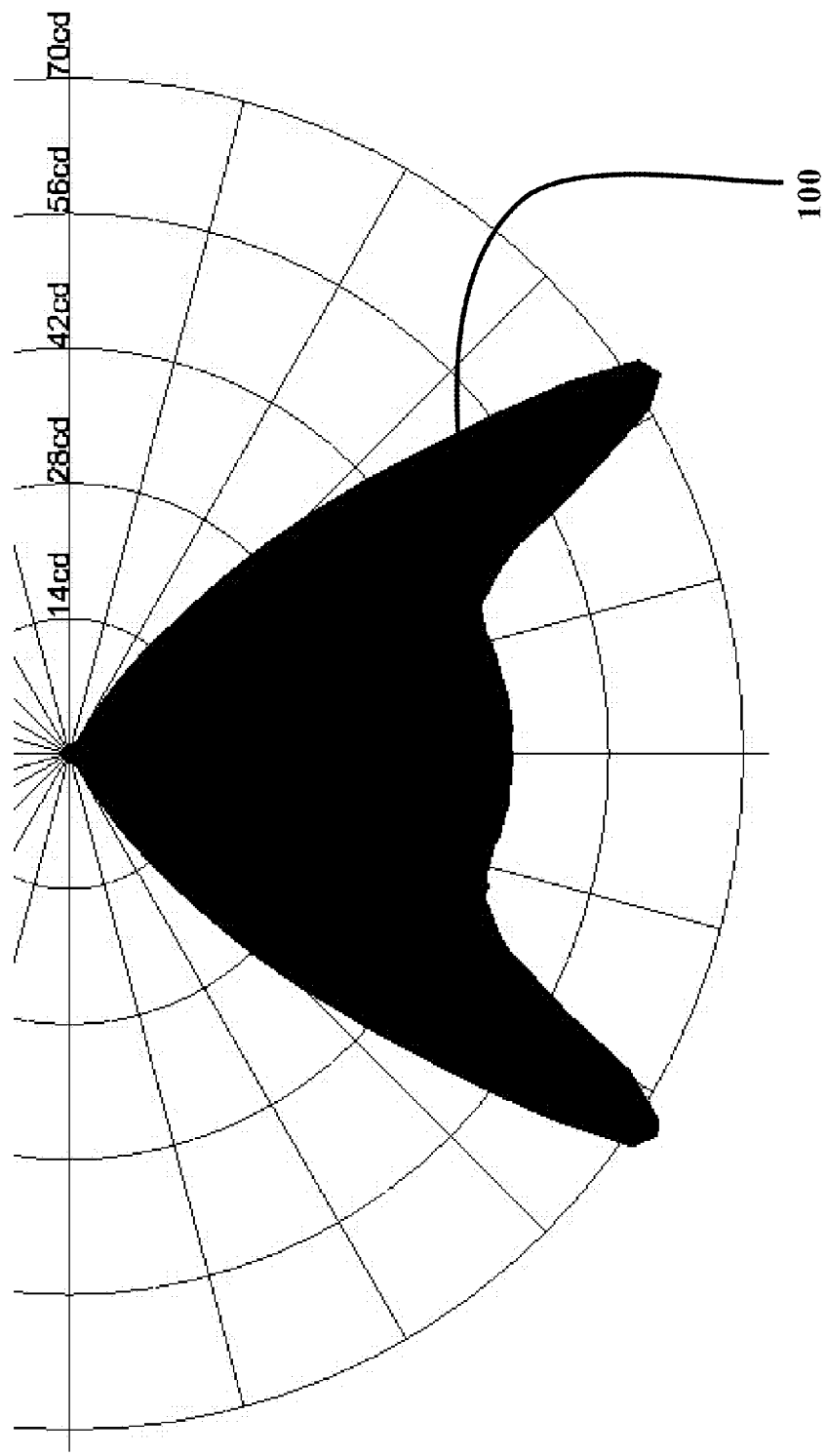
FIG. 12 is a polar intensity distribution in a plane which includes the emitter axis and is substantially orthogonal to the plane of FIG. 11, illustrating light directed toward the elongate light distribution.

FIGS. 1-12 show preferred embodiment of an inventive lens 10 in accordance with this invention for directing a majority of light from a light emitter 11 into an elongate distribution 100 with some lateral light 101 along the sides of elongate distribution 100, as illustrated in FIGS. 10-12. Emitter 11 has an axis 12 and includes at least one light-emitting diode (LED). FIGS. 8 and 9 illustrate light emitter 11 as including an LED package 13 which has a primary lens 14 over the at least one LED. These FIGURES illustrate lens 10 as a secondary lens placed over primary lens 14.

As seen in FIGS. 1-8, lens 10 includes an emitter-adjacent base 15 which defines a main plane 16. As best shown in FIGS. 6-9, main plane 16 is substantially normal to emitter axis 12. Base 15 forms an emitter-receiving opening 17 to an emitter-surrounding cavity 18. FIGS. 4-9 best illustrate that opening 17 is substantially-rectangular and cavity 18 has a front-to-back dimension 181 which is greater than a side-to-side dimension 182.

It is further seen in FIGS. 1, 2 and 4-9 that an inner surface 20 defines cavity 18 and includes a refracting inner surrounding surface 21 and a refracting inner end surface 25. FIGS. 6-9 show that inner surrounding surface 21 extends from opening 17 substantially orthogonally with respect to main plane 16 to terminate at refracting inner end surface 25. Inner end surface 25 is transverse emitter axis 12.

Lens 10 further includes a refracting main output surface 30 which is transverse emitter axis 12. Main output surface 30 includes front and back edges 31 and 32 and a pair of lateral edges 33 between front and back edges 31 and 32.

Figure 1:
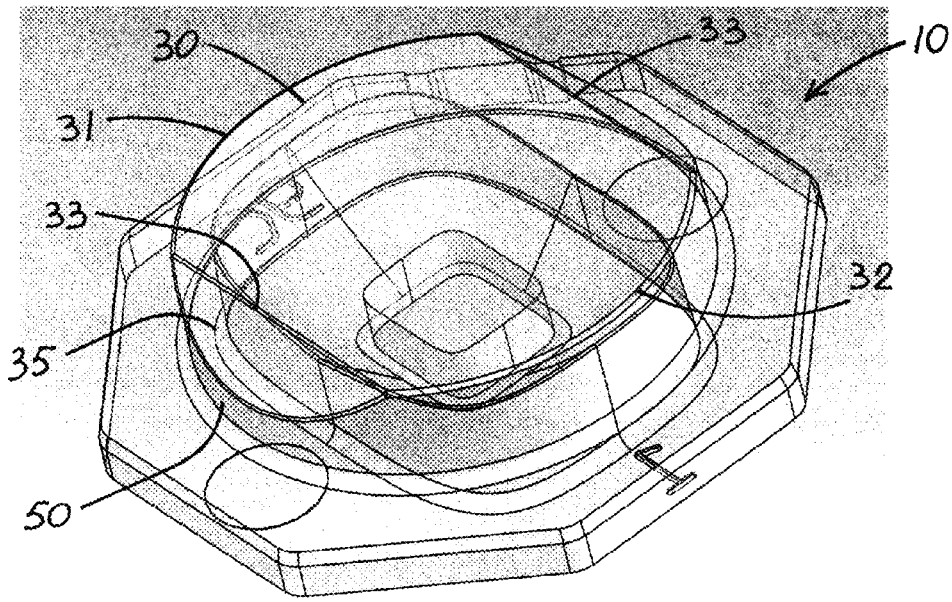
FIG. 1 is a perspective view of one embodiment of the lens of the present invention showing the lens from the light-output side.
Figure 2:
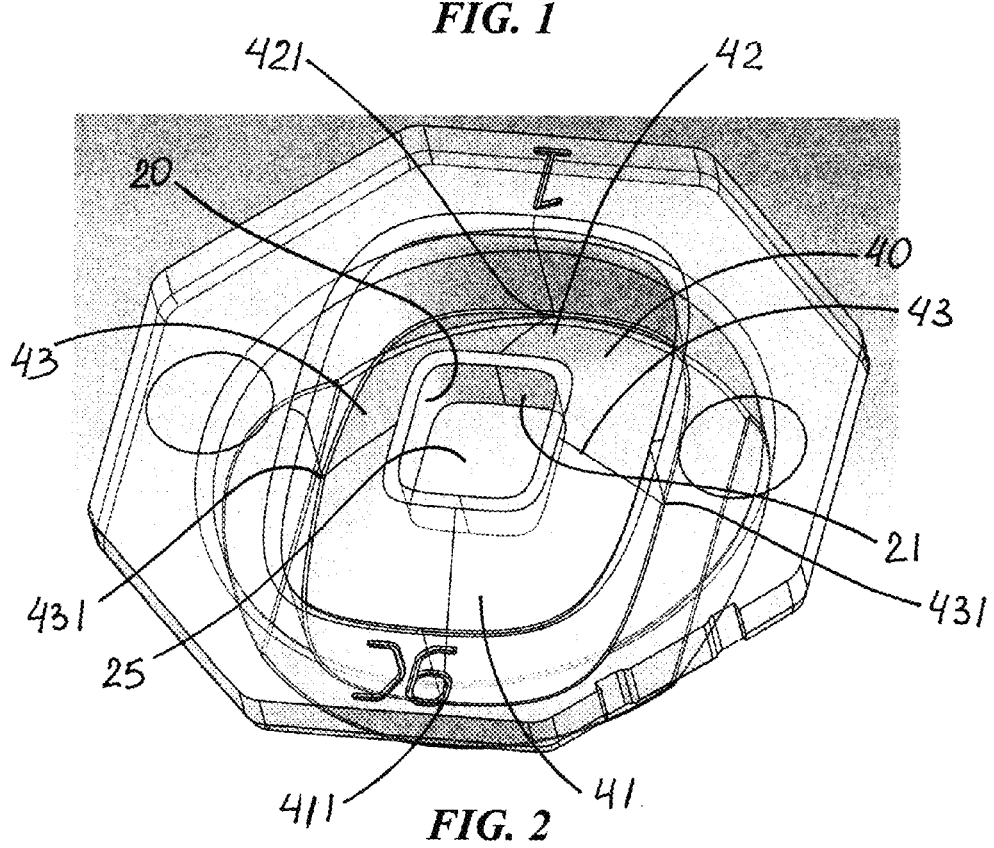
FIG. 2 is another perspective view of the embodiment of the lens of FIG. 1 showing the lens from the base side.

FIGS. 1, 2 and 6-9 show a reflecting surface 40 which extends from base 15 in a direction away from axis 12. FIGS. 1 and 2 further illustrate that reflective surface 40 is positioned outwardly of and around inner surrounding surface 21. FIGS. 8 and 9 further show that after light from emitter 11 is refracted by inner surrounding surface 21, reflective surface 40 receives substantially all forward and rearward light (best shown in FIG. 8) and a portion of lateral light (best shown in FIG. 9). As shown in FIGS. 8 and 9, reflective surface 40 is configured for a total internal reflection (TIR) of the received light toward main output surface 30.

It is also seen in FIGS. 8 and 9 that main output surface 30 receives light from refracting inner surface 20 and from reflecting surface 40 and forms elongate light distribution 100 (shown in FIGS. 10-12) by refracting such received light.

FIGS. 1, 2, 3, 5 and 7 best illustrate a pair of refracting lateral output surfaces 35 each extending from one of main-output-surface lateral edges 33 in a direction toward main plane 16. As best seen in FIG. 9, lateral output surfaces 35 receive and refract the other portion of the lateral light which is refracted by inner surrounding surface 21. Lateral output surfaces 35 refract such portion of the lateral light away from axis 12 to provide wide-angle distribution 101 along elongate distribution 100.

FIGS. 1, 2 and 6-8 further show that reflecting surface 40 includes front and back curves 41 and 42 and a pair of lateral curves 43. As best seen in FIGS. 1 and 2, each of lateral curves 43 are contiguous with front and back curves 41 and 42. FIGS. 6 and 8 best show that front and back curves 41 and 42 each have a first configuration. FIGS. 7 and 9 best show that pair of lateral curves 43 each have a second configuration. It is best seen in FIGS. 1 and 2 that the second configuration is different from the first configuration. FIGS. 6-9 show reflecting surface 40 being convex.

FIGS. 1 and 6-9 show reflecting surface 40 terminating at distances from plane 16 which are greatest at each center 411 and 421 of front and back curves 41 and 42, respectively, and gradually decrease toward a center 431 of each of lateral curves 43. It is further seen in FIGS. 4 and 6-9 that reflecting surface 40 terminates at distances from emitter axis 12 and from main plane 16 which are greatest distances 44 and 44a, respectively, at centers 411 and 421 of each of front and back curves 41 and 42 and gradually decrease toward smallest distance 45 from axis 12 and distance 45a from plane at centers 431 of each of lateral curves 43. FIGS. 6-9 also show that an angle 46 between main plane 16 and each of lateral curves 43 of reflecting surface 40 is greater than an angle 47 between main plane 16 and each of front and back curves 42 and 43.

FIGS. 4 and 6-8 show front and back curves 41 and 42 each bilaterally symmetric. Lateral curves 43 are also each shown as bilaterally symmetric.

Figure 4:
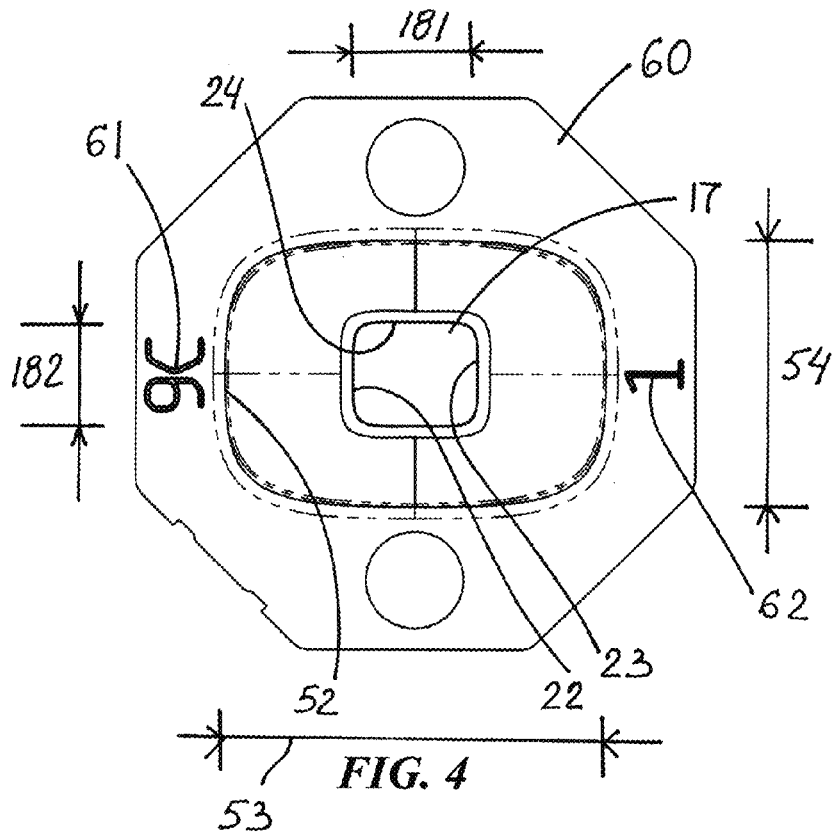
FIG. 4 is a base-side plan elevation of the embodiment of the lens of FIG. 1.

FIGS. 1, 2 and 4 best show inner surrounding surface 21 including front and back portions 22 and 23 and a pair of lateral portions 24. Lateral portions 24 each extends between front portion 22 and back portion 23 and each smoothly adjoins both front and back portions 22 and 23. As seen in FIGS. 8 and 9, front and back portions 22 and 23 receive emitter light which is emitted forward and rearward. The front and back portions 22 and 23 refract such emitter light away from axis 12 toward front and back curves 41 and 42 of reflecting surface 40. Lateral portions 24 each receive lateral emitter light and refract such light away from emitter axis 12. As illustrated in FIG. 9, a major amount of such lateral light is received by lateral curves 43 and is reflected via TIR toward main output surface 30. FIG. 9 also best illustrates a minor amount of the lateral light emitted at emission angles from main plane 30 which are greater than the emission angles of the major amount of the lateral light. Such minor amount of light, after being refracted by lateral portions 24 away from axis 12, bypasses reflective surface 40 and is received directly by a corresponding one of lateral output surfaces 35. Lateral output surfaces 35 refract such minor amount of lateral light further away from axis 12 for wide-angle lateral illumination 101 along elongate illumination 100. Smaller distances 45 and 45a at which lateral curves 43 of reflective surface 40 terminate from axis 12 and from plane 16, respectively, allow for the light bypass of reflective surface 40 toward lateral output surfaces 35.

FIGS. 1, 2 and 6-9 show front and back portions 22 and 23 and lateral portions 24 of inner surrounding surface 21 as planar Inner end surface 25 is also shown substantially planar and substantially normal to emitter axis 12. As illustrated in FIGS. 8 and 9, inner end surface 25 refracts emitter light toward emitter axis 12 for its further refraction by main output surface 30 to form elongate illumination pattern 100.

Figure 3:
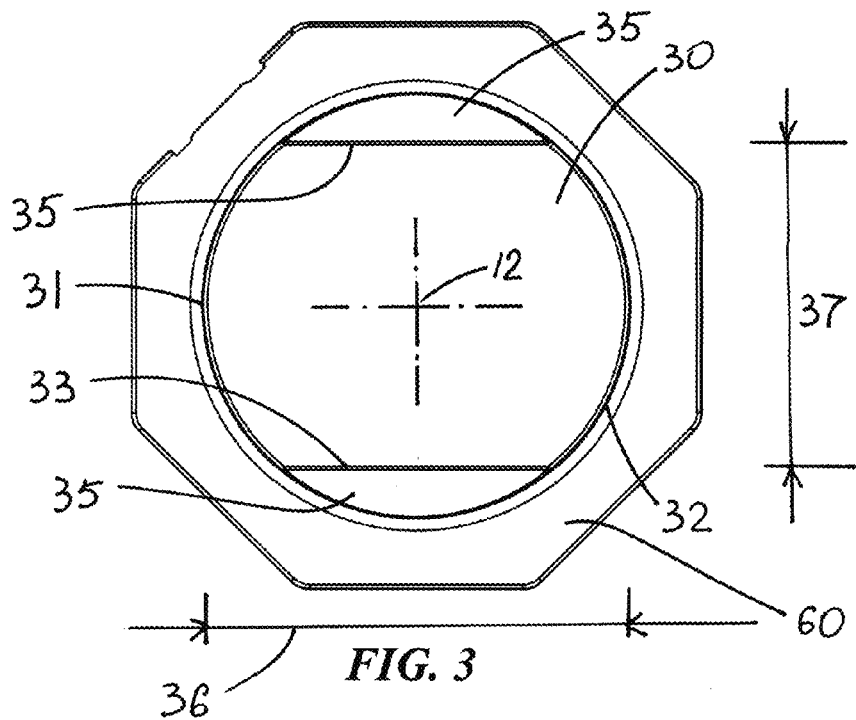
FIG. 3 is the output-side plan elevation of the embodiment of the lens of FIG. 1.

FIGS. 1, 2 and 6-9 further show refracting main output surface 30 as substantially planar and substantially normal to emitter axis 12. It is best seen in FIGS. 1 and 3 that a front-to-back dimension 36 of main output surface 30 is greater than a side-to-side dimension 37. It is best seen in FIG. 3 that front and back edges 31 and 32 extend along a single circle with the circle center on emitter axis 12. It is also seen that lateral edges 33 are substantially straight and extend substantially in a front-to-back direction parallel to each other. It is further best seen in FIG. 3 that, while the side-to-side dimension 37 is along the diameter of the same circle as front-to-back dimension 36, lateral portions of the circle are faceted off along substantially-straight lateral edges 33 to form lateral output surfaces 35. Lateral output surfaces 35 are shown substantially planar and extend from lateral edges 33 of main output surface 30.

Figure 5:
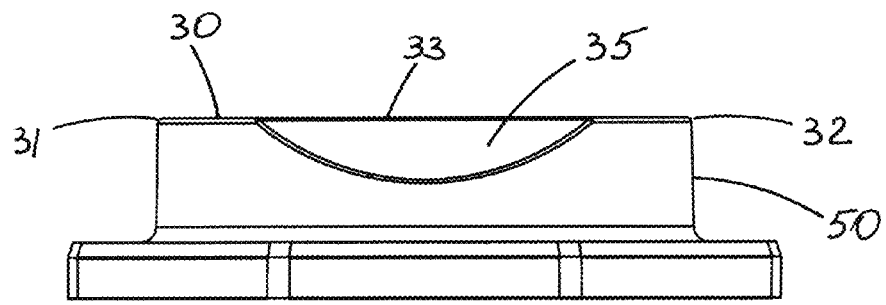
FIG. 5 is a lateral elevation of the embodiment of the lens of FIG. 1.

FIGS. 1, 2 and 6-9 also show lens 10 as having an outer surrounding wall 50. In FIGS. 1, 3 and 5, an outer side 51 of outer surrounding wall 50 is best seen as having a right cylindrical shape and extending from main output surface 30 and from each of lateral output surfaces 35 substantially orthogonally toward main plane 16. In FIGS. 2, 4 and 6-9, an inner side 52 of outer surrounding wall 50 is best seen as having an elongate cylindrical shape and extending from reflecting surface 40 toward plane 16 substantially orthogonal to main plane 16. As best shown in FIGS. 2 and 4, inner side 52 is elongate in the front-to-back direction such that an inner-side front-to-back dimension 53 is greater than a side-to-side dimension 54.

FIGS. 1-9 also show an outward flange 60 which extends from outer surrounding wall 50 away from axis 12. Flange 60 is shown as having octagonal perimeter which facilitates mounting of the lens during light-fixture assembly. Flange 60 best shown in FIGS. 1, 2, 3 and 4 also has a lens-type-identifying marking 61 and a locator label 62 which references the lens location in an LED-array module 70. An orientation between marking 61 and label 62 indicates a front-to-back longitudinal direction of elongate light distribution 100. It is best seen in FIGS. 6-9 that flange 60 extends beyond main plane 16 with respect to emitter axis 12 in a direction opposite the light emission. FIGS. 8 and 9 show that such spacing allows positioning of plane 16 at the same level with the LED of emitter 11 for most efficient capturing of emitter light.

Inventive lens 10 is shown bilaterally symmetric in the front-to-back direction and bilaterally symmetric in a side-to-side direction which is orthogonal to the front-to-back direction.

While the principles of this invention have been described in connection with specific embodiments, it should be understood clearly that these descriptions are made only by way of example and are not intended to limit the scope of the invention.

The invention claimed is:

1. A lens for distribution of light from a light emitter having an axis, the lens comprising:
    a refracting inner surface defining an inner cavity with a closed-perimeter opening defined in a base plane by substantially straight edge portions each adjoining a pair of curved edge portions, the refracting inner surface extending from the opening to terminate at a refracting inner end surface transverse the axis;
    a refracting main output surface transverse the axis and having front and back edges and a pair of lateral edges therebetween;
    a pair of refracting lateral output surfaces each extending from one of the main-output-surface lateral edges toward the base plane, the lateral output surfaces being configured to refract a portion of lateral light away from the axis; and
    a reflecting surface positioned outwardly of and around the inner surrounding surface to receive substantially all forward and rearward light and a base-plane-adjacent portion of lateral light refracted by the inner surrounding surface for total internal reflection (TIR) toward the main output surface.

2. The lens of claim 1 wherein the reflecting surface includes:
    front and back curves each having a first configuration; and
    a pair of lateral curves each having a second configuration which differs from the first configuration.

3. The lens of claim 2 wherein the reflecting-surface terminates at distances from the base plane which are greatest at a center of each of the front and back curves and gradually decrease toward a center of each of the lateral curves for the other portion of the lateral light to pass directly from the inner surfaces to the lateral output surfaces.

4. The lens of claim 2 wherein:
the front and back curves are each bilaterally symmetric; and
the lateral curves are each bilaterally symmetric.

5. The lens of claim 1 wherein the opening and the cavity have a front-to-back dimension which is greater than a side-to-side dimension.

6. The lens of claim 5 wherein the refracting inner surface includes:
front and back portions refracting forward and rearward emitter light away from the axis; and
a pair of lateral portions each between the front and back portions and refracting lateral emitter light away from the emitter axis.

7. The lens of claim 6 wherein the front and back portions of the refracting inner surface are substantially planar.

8. The lens of claim 1 wherein the opening is defined by four substantially straight edge portions.

9. The lens of claim 8 wherein the refracting inner surrounding surface includes:
substantially planar front and back portions refracting forward and rearward emitter light away from the axis; and
a pair of substantially planar lateral portions each between the front and back portions.

10. The lens of claim 1 further including:
an outer surrounding wall extending from the output surfaces and the reflecting surface toward the plane; and
an outward flange extending from the outer surrounding wall away from the axis.

11. The lens of claim 1 being bilaterally symmetric in a front-to-back direction.

12. The lens of claim 11 being bilaterally symmetric in a side-to-side direction.

13. The lens of claim 1 wherein the light emitter includes at least one light-emitting diode (LED).

14. The lens of claim 13 wherein:
the light emitter includes an LED package having a primary lens over the at least one LED; and
the lens is a secondary lens placed over the primary lens.

15. A lens for distribution of light from a light emitter having an axis, comprising:
an inner cavity defined by a refracting inner surface extending from an opening into the lens cavity with a closed-perimeter opening having substantially straight edge portions each adjoining a pair of curved edge portions;
a refracting main output surface transverse the axis; and
a reflecting surface extending from the base plane away from the axis outwardly of and around the inner surface and receiving substantially all forward and rearward light and a portion of lateral light refracted by the inner surface for total internal reflection (TIR) toward the main output surface.

16. The lens of claim 15 wherein the main output surface is substantially normal to the emitter axis.

17. The lens of claim 15 wherein a front-to-back dimension of the main output surface is greater than a side-to-side dimension of the main output surface.

18. The lens of claim 17 wherein the main output surface has a pair of convex front and back edges each extending between a pair of substantially-straight lateral edges.

19. The lens of claim 18 wherein:
the front and back edges extend along sectors of a circle with a center on the emitter axis; and
the lateral edges are substantially parallel to each other.

20. The lens of claim 18 further comprising a pair of refracting lateral output surfaces each extending from one of the main-output-surface lateral edges toward a base plane defined by edges of the opening into the cavity, each of the lateral output surfaces are substantially planar.

21. The lens of claim 15 further including a pair of refracting lateral output surfaces each extending from the main output surface toward the lens base and refracting the other portion of the lateral light away from the axis into the wide-angle distribution.

22. The lens of claim 21 wherein:
the main output surface is substantially planar and has front and back edges and a pair of lateral edges therebetween; and
each lateral output surface extends from a corresponding one of the lateral edges toward the base.

23. The lens of claim 22 wherein:
the front and back edges are along sectors of a single circle with the center on the emitter axis; and
the lateral edges are substantially parallel to each other.

24. The lens of claim 21 wherein the reflecting surface includes:
front and back curves each having a first configuration; and
a pair of lateral curves each having a second configuration which differs from the first configuration.

25. The lens of claim 15 wherein the refracting inner surface includes an inner surrounding surface extending from the opening substantially parallel with respect to the axis to terminate at an inner end surface which is transverse the axis.

26. The lens of claim 24 wherein:
the front and back curves are each bilaterally symmetric; and
the lateral curves are each bilaterally symmetric.

27. The lens of claim 26 wherein the reflecting surface terminates at distances from the base plane which are greatest at centers of the front and back curves and gradually decrease toward centers of the lateral curves.

28. The lens of claim 27 wherein the cavity and the opening have a front-to-back dimension greater than a side-to-side dimension.

29. The lens of claim 25 wherein the inner surrounding surface includes:
front and back portions refracting forward and rearward emitter light away from the axis and toward the front and back curves; and
a pair of lateral portions each between the front and back portions and refracting lateral emitter light away from the emitter axis.

30. The lens of claim 29 wherein the front and back portions and the lateral portions of the inner surrounding surface are substantially planar.

31. The lens of claim 25 wherein the inner end surface is substantially planar and is substantially normal to the emitter axis.

32. The lens of claim 21 wherein:
the main output surface is substantially planar and is substantially normal to the axis; and
each of the lateral output surfaces is substantially planar.

33. The lens of claim 32 wherein a main-output-surface front-to-back dimension is greater than a side-to-side dimension.

34. The lens of claim 15 being bilaterally symmetric in a front-to-back direction and bilaterally symmetric in a side-to-side direction.

35. The lens of claim 15 wherein the opening has four substantially straight edge portions.

36. The lens of claim 35 wherein the inner surrounding surface includes:
   substantially planar front and back portions refracting forward and rearward emitter light away from the axis; and
   a pair of substantially planar lateral portions each between the front and back portions.

\* \* \* \* \*